D. D. DYKES.
DISPENSER FOR EXPLOSIVES.
APPLICATION FILED OCT. 13, 1916.
1,284,622.
Patented Nov. 12, 1918.
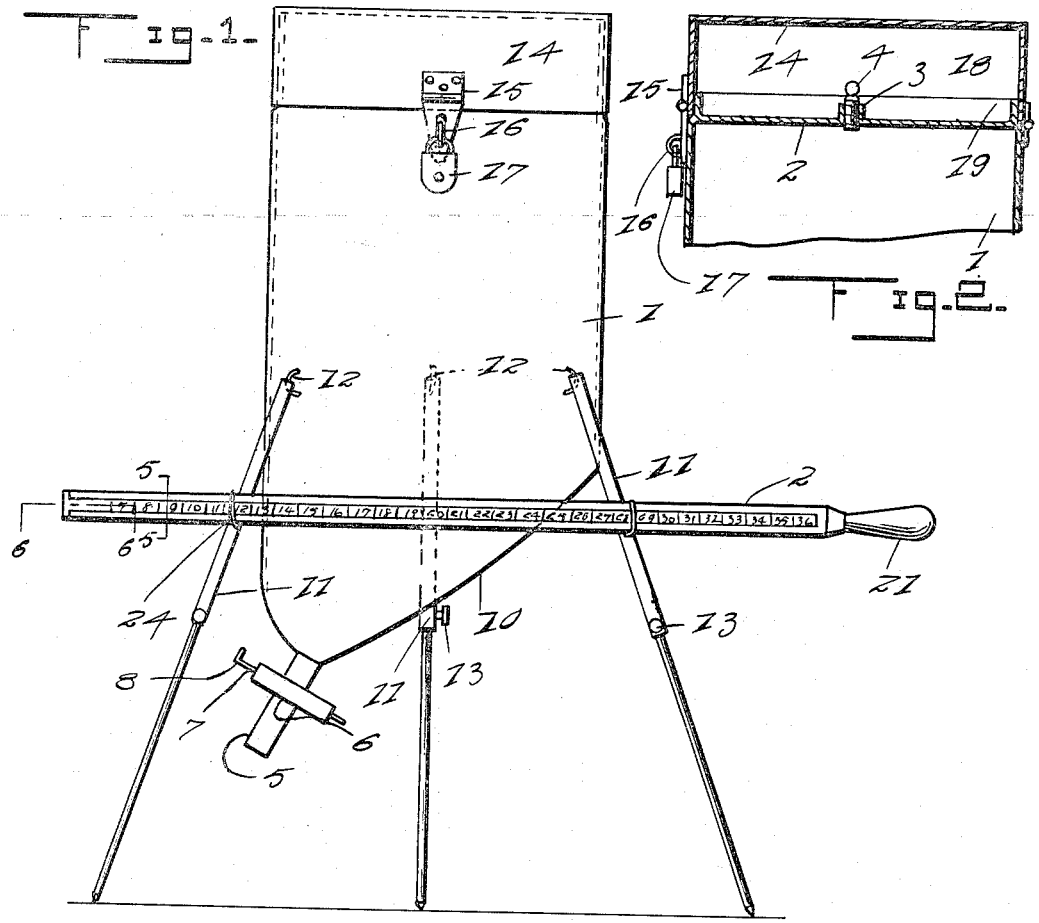
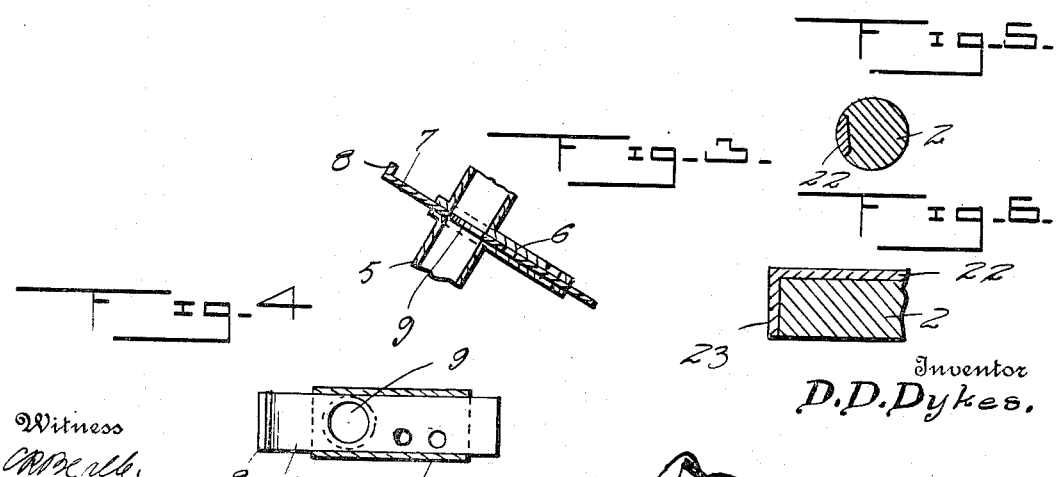
Inventor
D. D. Dykes.

UNITED STATES PATENT OFFICE.

DAVID D. DYKES, OF GRUETLI, TENNESSEE.

DISPENSER FOR EXPLOSIVES.

1,284,622.  Specification of Letters Patent.  Patented Nov. 12, 1918.

Application filed October 13, 1916. Serial No. 125,384.

*To all whom it may concern:*

Be it known that I, DAVID D. DYKES, a citizen of the United States, residing at Gruetli, in the county of Grundy and State of Tennessee, have invented certain new and useful Improvements in Dispensers for Explosives; and I do hereby declare the following to be a full, clear, and exact description of the invention, such as will enable others skilled in the art to which it appertains to make and use the same.

This invention relates to new and useful improvements in a dispenser for explosives and one of its objects is the provision of a device of this character, which shall be simple, durable and efficient, and which may be manufactured and sold at a comparatively low cost.

Another object of this invention is to provide a powder receptacle having an outlet spout at the bottom thereof and in which is secured a slide for controlling the outflow of powder from the receptacle into a cartridge.

A further object of this invention is to provide a cover hinged to the receptacle for forming a storage chamber for fuses, caps and the like and which prevents powder from being removed from the top of the receptacle when the cover is in a closed position and locked.

A still further object of this invention is to provide a cartridge stick having a scale thereon removably secured to the supporting legs of the receptacle for packing powder into cartridges after being dispensed from the receptacle into the cartridge.

With these and other objects in view as will become more apparent as the description proceeds, the invention consists in such novel features of construction, combination and arrangement of parts as will be hereinafter more fully described and claimed.

For a complete understanding of my invention, reference is to be had to the following description and accompanying drawing, in which:—

Figure 1 is a side elevation of a dispenser for explosives, constructed in accordance with my invention, Fig. 2 is a fragmentary vertical sectional view illustrating the cover for forming a storage chamber, Fig. 3 is a fragmentary sectional view of a spout illustrating the slide, Fig. 4 is a detail sectional view of the slide illustrating means for locking the slide against movement, Fig. 5 is a sectional view taken on the line 5—5 of Fig. 1, and Fig. 6 is a sectional view taken on the line 6—6 of Fig. 1.

Referring in detail to the drawing, the numeral 1 indicates a powder receptacle, having its upper end closed by a top wall 2, having an internally screw threaded boss 3 formed centrally thereof to receive a screw threaded plug 4. The powder receptacle 1 has formed upon its lower end and adjacent one edge a spout 5 which is slotted and provided with a pair of extensions 6 to slidably receive a slide 7. The slide 7 has one of its ends bent at right angles as illustrated at 8 to form a stop and a hand grip. The slide 7 has an enlarged opening 9 adapted to be brought in registration with the spout 5 for allowing powder to be withdrawn from the receptacle 1. The extensions 6 and the slide 7 are provided with apertures to receive a padlock for locking the slide against movement when desired. The bottom wall of the receptacle 1 is inclined as illustrated at 10 to cause the powder within the receptacle to normally slide in the direction of the spout 5. The receptacle 1 has secured thereto a plurality of legs 11 by means of staples 12. Each leg consists of a pair of sections, one section telescoping with the other section and being held against movement by set screws 13 whereby the height of the receptacle 1 may be readily regulated.

A cover 14 is hinged to the upper end of the receptacle 1 and has secured thereto a hub 15 to receive a staple 16 carried by the receptacle for locking the cover 14 upon the receptacle 1 by means of a padlock 17 passing through the staple 16. The cover 14 forms a storage chamber 18 in which fuses, caps and the like may be stored. A flange 19 is formed on the upper end of the receptacle 1 and extends upwardly within the cover 14 when in a closed position to aid in holding the cover upon the receptacle and also preventing articles placed within the storage chamber 18 from falling from the top of the receptacle when the cover 14 is swung to an open position.

A cartridge stick 20 having a handle 21 formed on one end is provided with a groove in which is slidably mounted a metallic strip 22 having a scale thereon. One end of the metallic strip 22 is bent at right angles to overlie the end of the cartridge stick 20 as clearly illustrated at 23 to prevent the stick from becoming injured or worn out during use. The cartridge stick 20 is supported by a pair of hooks 24 carried by a pair of legs which support the receptacle 1. The cartridge stick is preferably enlarged at the handle end and tapering in the direction of the other end, so that a paper cartridge after being formed on the stick can be readily removed therefrom, by sliding it off the tapered end. Paper cartridges are formed by soaping the paper and wrapping it about the stick, tearing the paper off at a desired number of inches by the scale on the stick so that various sizes of cartridges may be made to hold various charges of powder.

In operation, the cover 14 is swung rearwardly upon the hinge and the plug 4 is removed from the boss 3 and powder is poured into the receptacle 1 by a funnel or the like. When desiring to fill ornament cartridges or the like, the cartridge is placed under the spout 5 and the slide 7 is slid within the extensions 6 until the enlarged opening 9 registers with the spout, thus allowing the powder within the receptacle 1 to pass through the spout 5 into the cartridge. After the cartridge has been sufficiently filled with powder, the usual wadding or packing is placed therein and the cartridge 20 is then inserted within the end of the cartridge to pack the packing and powder within the cartridge.

From the foregoing description it will be noted that a cartridge may readily be filled with powder without the danger of the powder becoming exposed to an artificial light, obviating the danger of explosions caused by cartridges being filled adjacent a lighted lamp or the like. It will also be noted that the powder within the receptacle 1 is kept entirely water-proof and further protected from dirt and other foreign matter.

While I have shown and described the preferred embodiment of my invention, it will be understood that minor changes of construction, combination and arrangement of parts may be made without departing from the spirit and scope of the invention as claimed.

Having thus described my invention what I claim is:

A dispenser for explosives comprising a substantially rectangular receptacle, said receptacle having an inclined bottom wall extending downwardly from one side wall in the direction of the other side wall, a spout formed on the bottom wall adjacent the last-named side wall and having a slot therein, a lateral extension carried by said spout slot and having an opening and a slot forming an extension of the slot in the spout, a slide slidable in said extension and through the slot and having an opening adapted to be registered with the spout, said slide having an opening adapted to be registered with the opening in the extension for receiving a lock to hold the opening in the slide out of registration with the spout.

In testimony whereof I affix my signature in presence of two witnesses.

DAVID D. DYKES.

Witnesses:
S. H. MYERS,
U. H. LASATER.